US009900738B2

(12) United States Patent
Doherty (10) Patent No.: US 9,900,738 B2
(45) Date of Patent: Feb. 20, 2018

(54) SYSTEM AND METHOD OF AUTOMATICALLY IDENTIFYING MOBILE COMMUNICATION DEVICES WITHIN THE VICINITY OF A GUNSHOT

(71) Applicant: Massachusetts Institute of Technology, Cambridge, MA (US)

(72) Inventor: John Houston Doherty, Nashua, NH (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/381,234

(22) Filed: Dec. 16, 2016

(65) Prior Publication Data

US 2017/0180926 A1    Jun. 22, 2017

Related U.S. Application Data

(60) Provisional application No. 62/270,837, filed on Dec. 22, 2015.

(51) Int. Cl.
*H04W 4/02* (2009.01)
*H04W 24/02* (2009.01)
(Continued)

(52) U.S. Cl.
CPC .............. *H04W 4/02* (2013.01); *H04W 8/26* (2013.01); *H04W 16/18* (2013.01); *H04W 24/02* (2013.01); *H04W 36/08* (2013.01)

(58) Field of Classification Search
CPC ......... H04W 4/02; H04W 24/02; H04W 8/26; H04W 36/08; H04W 16/18; H04W 4/021;
(Continued)

(56) References Cited

U.S. PATENT DOCUMENTS 6,415,542 B1    7/2002 Bates et al.
6,438,887 B1    8/2002 Martin
(Continued)

FOREIGN PATENT DOCUMENTS

EP    2 282 158 A1    9/2011
EP    2 525 184 A1    11/2012

OTHER PUBLICATIONS

International Search Report and the Written Opinion of the International Searching Authority in International Application No. PCT/US16/67490 dated Mar. 10, 2017.
(Continued)

*Primary Examiner* — Meless Zewdu
(74) *Attorney, Agent, or Firm* — Nutter McClennan & Fish LLP (57) ABSTRACT

Control systems and methods are disclosed for automatically identifying mobile communication devices located within a vicinity of a gunshot. The control system may discriminates gunshots from other environmental noise and determine the location of the gunshot from information provided by a set of acoustic sensors. Once the gunshot location is determined, the control system may automatically trigger activation of one or more cell site simulators located near the location of the gunshot to identify mobile communication devices within the vicinity. Further precision in identifying the locations of the mobile communication devices may be obtained by using information from radio frequency (RF) sensors that intercept wireless RF transmissions from the mobile communication devices communicating with the activated cell site simulator. The control system may be used as a tool identifying and tracking perpetrators of gun crime and may also be used to located witnesses who may otherwise not have come forward.

20 Claims, 8 Drawing Sheets

(51) Int. Cl.
  *H04W 8/26* (2009.01)
  *H04W 36/08* (2009.01)
  *H04W 16/18* (2009.01)

(58) Field of Classification Search
  CPC ..... H04W 4/025; H04W 4/005; H04W 16/16; H04W 88/02; H04W 88/04; H04W 88/08; H04W 88/085; H04W 4/22; H04W 76/02; H04B 17/00; H04B 17/10; H04M 3/5116
  See application file for complete search history.

(56) References Cited

U.S. PATENT DOCUMENTS

| | | | |
|---|---|---|---|
| 6,965,541 B2 | 11/2005 | Lapin et al. | |
| 7,921,588 B2 | 4/2011 | Brown et al. | |
| 8,312,660 B1 | 11/2012 | Fujisaki | |
| 8,570,911 B2* | 10/2013 | Song | H04L 12/1881 370/270 |
| 8,798,762 B2 | 8/2014 | Fain et al. | |
| 9,348,010 B1 | 5/2016 | Showen | |
| 2002/0003470 A1* | 1/2002 | Auerbach | F41H 11/00 340/425.5 |
| 2003/0182055 A1 | 9/2003 | Curatolo et al. | |
| 2004/0099134 A1 | 5/2004 | Gotfried | |
| 2006/0086032 A1 | 4/2006 | Valencic et al. | |
| 2006/0105793 A1* | 5/2006 | Gutowski | H04W 4/02 455/518 |
| 2006/0194553 A1 | 8/2006 | Ozaki et al. | |
| 2008/0039962 A1 | 2/2008 | McRae | |
| 2011/0025491 A1 | 2/2011 | Cazanas et al. | |
| 2011/0169633 A1 | 7/2011 | Lauder et al. | |
| 2013/0202120 A1 | 8/2013 | Bickel et al. | |
| 2013/0247094 A1* | 9/2013 | Hardin | H04N 21/2385 725/33 |
| 2013/0273504 A1 | 10/2013 | Carter | |
| 2014/0378088 A1 | 12/2014 | Goel et al. | |
| 2015/0310742 A1* | 10/2015 | Albornoz | G08G 1/096716 340/905 |
| 2016/0096473 A1* | 4/2016 | Park | B60Q 9/00 340/436 |
| 2017/0171722 A1* | 6/2017 | Lee | H04W 4/06 |
| 2017/0301220 A1* | 10/2017 | Jarrell | G08B 25/10 |

OTHER PUBLICATIONS

Hsu, "Weapons Manufacturer Unveils Black Box for Guns", http://www.popsci.com/technology/article/2009-11/weapons-manufacturer-unveils-black-box-guns, Popular Science, 2 pages, (Nov. 16, 2009).

Rutherford, "Black Box keeps tabs on weapons", https://www.cnet.com/news/black-box-keeps-tabs-on-weapons, CNET, Sci-Tech, 2 pages, (Nov. 16, 2009).

\* cited by examiner

SYSTEM AND METHOD OF AUTOMATICALLY IDENTIFYING MOBILE COMMUNICATION DEVICES WITHIN THE VICINITY OF A GUNSHOT

RELATED APPLICATIONS

This application claims the benefit of U.S. Provisional Patent Application No. 62/270,837, filed on Dec. 22, 2015, the entire contents of which are incorporated herein by reference.

GOVERNMENT RIGHTS

This invention was made with government support under FA8721-05-C-0002 awarded by U.S. Air Force. The government has certain rights in the invention.

BACKGROUND

Gun violence is a systemic threat to society. Detecting gun shots may enable rapid response and provide greater situational awareness to law enforcement, intelligence, and military agencies. Although existing sensor systems may detect gunshots and providing a bearing or range to the source, such systems generally lack the capability to identify or track the individual perpetrator. Military, intelligence, and law enforcement agencies have access to cellular telephone surveillance devices, such as cell site simulators, that enable identification and tracking of cellular telephones. However, such devices generally require a mobile station and a human operator with advance knowledge of a location of interest or a targeted individual's cell phone number. While existing cell site simulators may be useful in identifying insurgent networks or tracking known fugitives, slow response times of a human operator limits their effectiveness against an unexpected event, such as gun crimes that occur at unpredictable times.

SUMMARY

Various embodiments are disclosed for automatically identifying mobile communication devices located within a vicinity of a gunshot. Various embodiments may include a control system that discriminates gunshots from other environmental noise and determines the location of the gunshot from information provided by a set of acoustic sensors. Once the gunshot location is determined, the control system may automatically trigger activation of one or more cell site simulators located near the location of the gunshot to identify mobile communication devices within the vicinity. Further precision in identifying the locations of the mobile communication devices may be obtained by using information from radio frequency (RF) sensors that intercept wireless RF transmissions from the mobile communication devices communicating with the activated cell site simulator. Various embodiments may be a valuable tool for identifying and tracking perpetrators of gun crime and may also be used to located witnesses who may otherwise not have come forward.

In some embodiments, a method of automatically identifying mobile communication devices located within a vicinity of a gunshot may include determining a location of the gunshot based on information provided by multiple acoustic sensors that detect an acoustic signal generated by the gunshot, activating a cell site simulator having a wireless communication range that includes the location of the gunshot in response to determining the location of the gunshot, obtaining identifying information of one or more mobile communication devices communicating with the activated cell site simulator, and providing the identifying information of the one or more mobile communication devices to an output device. In some embodiments, the identifying information may include an identifier that uniquely identifies a subscriber of the device, the device itself, or any combination thereof.

In some embodiments, activating the cell site simulator having a wireless communication range that includes the location of the gun shot may include activating one of the cell site simulators that is located closest to the determined location of the gunshot. Activating the cell site simulator may cause the cell site simulator to broadcast a RF signal to trigger a response from the one or more mobile communication device to the cell site simulator that contains the identifying information of the respective mobile communication device. In some embodiments, the RF signal that is broadcast by the activated cell site simulator may include a cell reselection offset that causes the one or more mobile communication devices to perform cell reselection with the activated cell site simulator.

In some embodiments, the method may further include determining a location for each of the one or more mobile communication devices communicating with the activated cell site simulator based on information provided by multiple RF sensors that intercept RF signals communicated from the mobile communication devices to the activated cell site simulator and providing to the output device the identifying information of at least one of the one or more mobile communication devices that is determined to be located within a defined geographic region that includes the location of the gunshot. Determining a location for each of the one or more mobile communication devices communicating with the activated cell site simulator based on information provided by the RF sensors may include determining the location of a mobile communication device based on differences in arrival time, phase, or amplitude of an RF signal received at the activated cell site simulator and intercepted by the plurality of RF sensors.

In some embodiments, determining the location of the gunshot based on the information provided by the acoustic sensors may include determining the location of the gunshot based on differences in arrival time, phase, or amplitude of the acoustic signal detected at the plurality of acoustic sensors. In some embodiments, the method may further include determining the differences in arrival time, phase, or amplitude of the acoustic signal detected at the acoustic sensors based on respective digital representations of the acoustic signal provided by the acoustic sensors.

Further embodiments may include a computing device processor configured to perform operations of the methods summarized above. Further embodiments may include a computing device having means for performing functions of the methods summarized above. Further embodiments may include a non-transitory medium on which is stored processor-executable instructions configured to cause a processor to perform operations of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The term "gunshot" is used herein to refer to the discharge (e.g., firing) of a firearm or other weapon that produces a detectable sound or noise.

The term "computing device" is used herein to refer to an electronic device equipped with at least a processor. Examples of computing devices may include, but not limited to, mobile communication devices (e.g., cellular telephones, smart-phones, personal or mobile multi-media players, web-pads, tablet computers, Wi-Fi® enabled electronic devices, personal data assistants (PDA), personal computers (e.g., laptop computers), wearable devices, etc.) and server computing devices (e.g., desktop servers, cloud servers, etc.). In various embodiments, computing devices may be configured with memory and/or storage as well as wired or wireless communication capabilities, such as network transceiver(s) and antenna(s) configured to establish a wide area network (WAN) connection (e.g., a cellular network connection, etc.) and/or a local area network (LAN) connection (e.g., a wireless connection to the Internet via a Wi-Fi® router, etc.).

The term "wireless communication standard" is used herein to refer any cellular or mobile communication service or standard that is available or contemplated in the future. Such services and standards may include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., CDMAOne, CDMA2000), enhanced data rates for GSM evolution (EDGE), advanced mobile communication device system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), integrated digital enhanced network (iDEN), and/or the like. Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments provide systems, devices, and methods of automatically identifying mobile communication devices located within a vicinity of a gunshot. In some embodiments, a method and control system is provided that discriminates gunshots from other environmental noise and determines the location of the gunshot from information provided by a set of acoustic sensors. Once the gunshot location is determined, the control system may automatically trigger activation of one or more cell site simulators located near the location of the gunshot to identify mobile communication devices within the vicinity. In some embodiments, further precision in identifying the locations of the mobile communication devices may be obtained by using information from radio frequency (RF) sensors that intercept wireless RF transmissions from the mobile communication devices communicating with the activated cell site simulator. Various embodiments may be a valuable tool for identifying and tracking perpetrators of gun crime and may also be used to located witnesses who may otherwise not have come forward.

FIGS. 1A, 1B, 1C, and 1D are schematic diagrams that illustrate a system 100 for automatically identifying mobile communication devices located within a vicinity of a gunshot according to some embodiments. As shown, the system 100 may include a control server 110, multiple acoustic sensors $S_A$ (e.g., 120a, 120b, and 120c), one or more cell site simulators 130a and 130b, and multiple radio frequency (RF) sensors $S_{RF}$ (e.g., 140a, 140b, 140c).

Figure 1A:
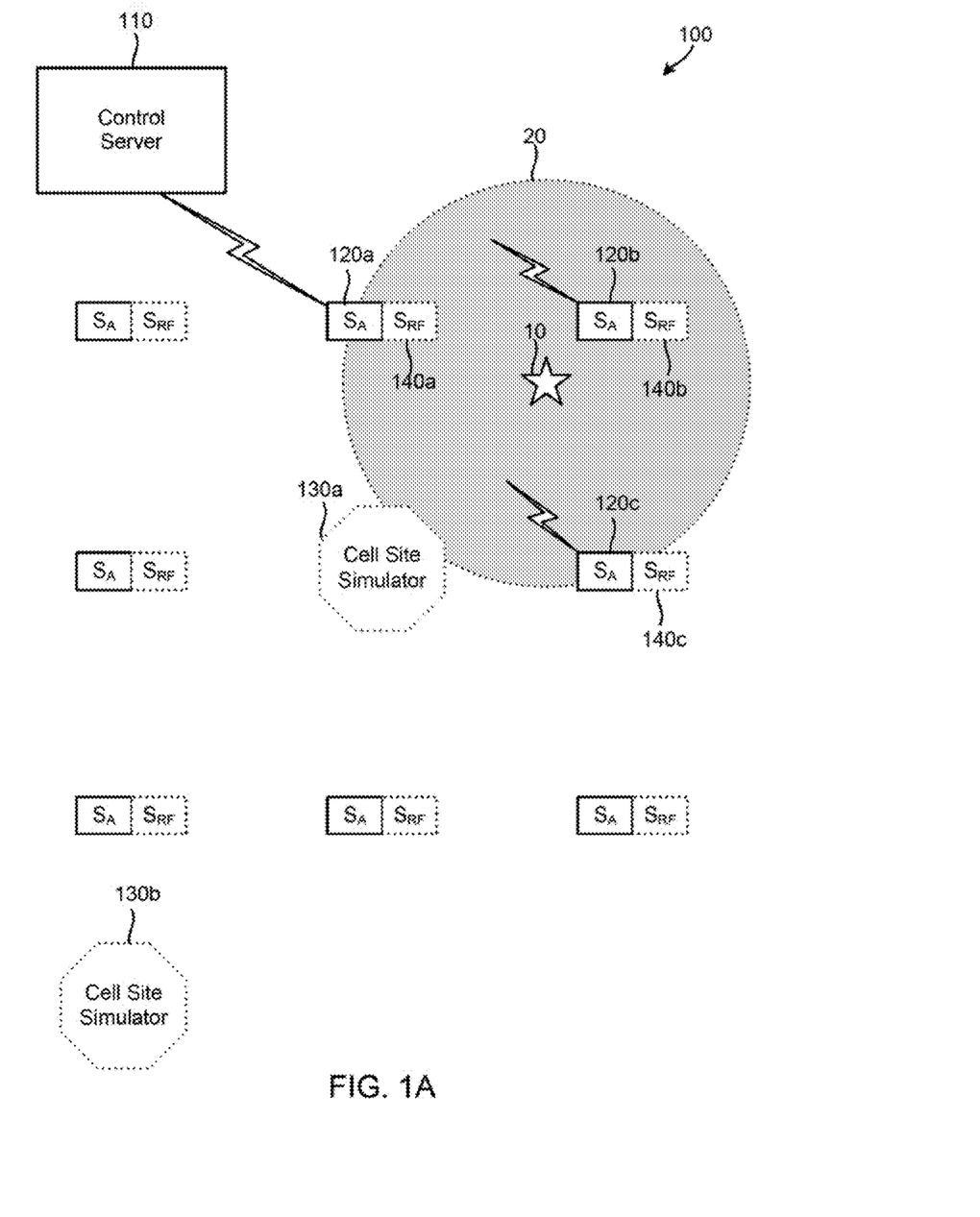
FIGS. 1A, 1B, 1C, and 1D is a schematic diagram illustrating components of a networked system for automatically identifying mobile communication devices within a vicinity of a gunshot according to some embodiments.

Referring to FIG. 1A, the acoustic sensors $S_A$ may be computing devices that are distributed over a target geographical area and configured to receive acoustic wave signals from the environment (e.g., sounds, noise, etc.). The acoustic sensors $S_A$ may be positioned at fixed locations including, but not limited to, buildings, utility poles, rooftops, or cell towers, for example. In some embodiments, the acoustic sensors $S_A$ may be configured to detect a gunshot from an analysis of the acoustic signals received from the environment or digital representations thereof. For example, a set of the acoustic sensors $S_A$ (e.g., 120a, 120b, and 120c, collectively 120) may detect an acoustic wave signal 20 generated by the gunshot at a location 10. In some embodiments, the gunshot-generated acoustic signal 20 may be filtered out from benign background noise using a machine learning algorithm that uses previously collected data to discriminate based on the amplitude and frequency content of the signal as well as comparing signals between different sensors. Other existing techniques may be employed for detecting gunshots.

In response to detecting a gunshot, the acoustic sensors 120 may respectively transmit information representative of the detected acoustic signal 20 over a wired or wireless network to the control server 110 to determine the location of the gunshot 10. For example, the control server 110 is a computing device that may use a geolocation technique to determine the gunshot location based on differences in arrival time, phase, or amplitude of the gunshot-generated acoustic signal 20, or any combination thereof, detected at the acoustic sensors 120.

Figure 1B:
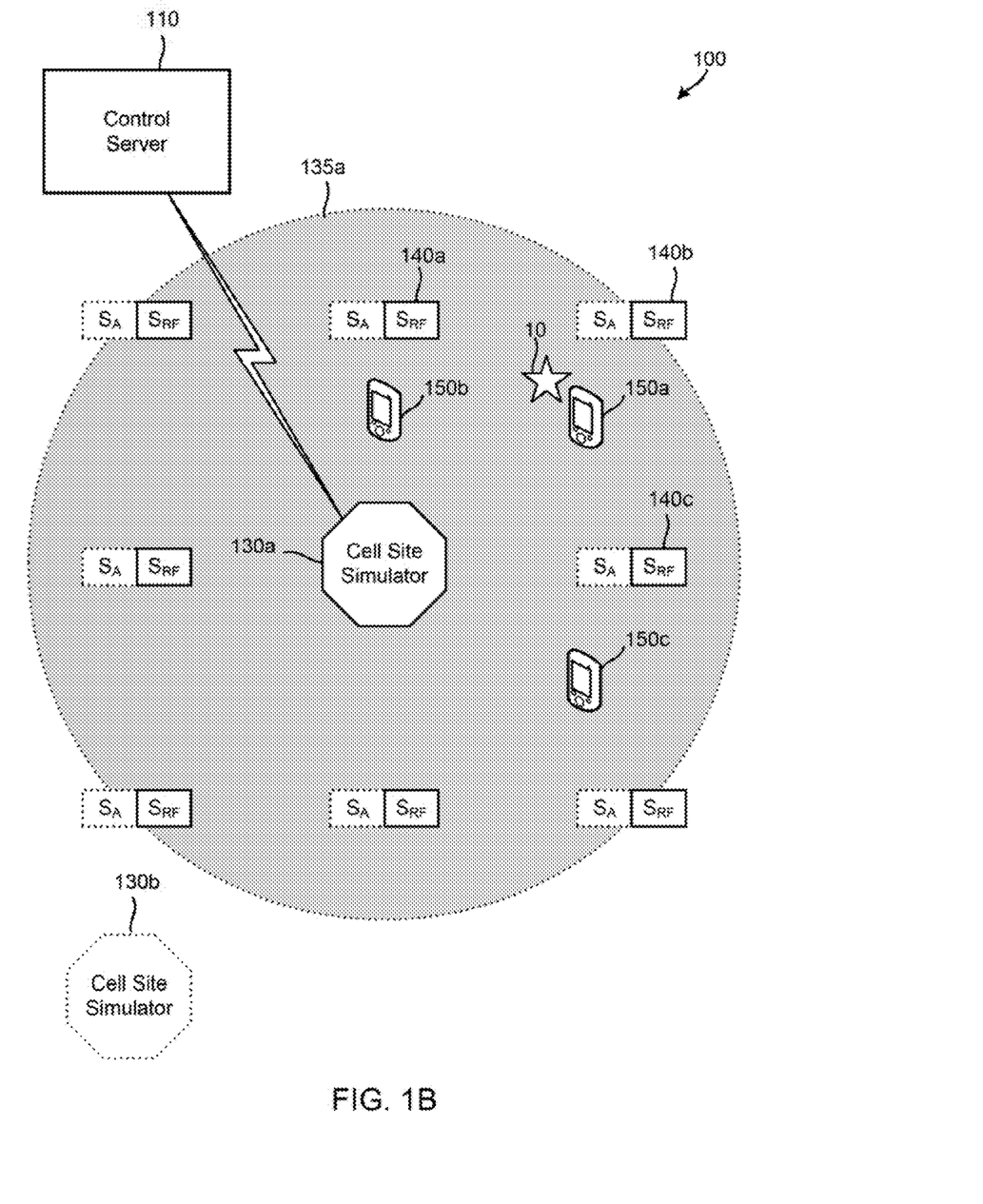

Referring to FIG. 1B, the system 100 may include one or more cell site simulators 130a and 130b that are available for activation by the control server 110. The cell site simulators may be computing devices that mimic or spoof the behavior of a base transceiver station (BTS), Node B, Evolved Node B (eNodeB) or other existing wireless transceiver device. In some embodiments, the cell site simulators may be positioned within or in close proximity to the target geographical area at fixed locations. Such locations may include, but are not limited to, buildings, utility poles, rooftops, or cell towers. The number and positioning of the one or more cell site simulators may be determined such that the aggregate wireless communication range of the cell site simulators covers the target geographical area.

In response to determining the location of the gunshot, the control server 110 may activate a cell site simulator 130a having a wireless communication range 135a that includes the determined gunshot location 10. The activated cell site simulator 130a may broadcast RF signals according to a wireless communication standard in order to initiate communication with one or more mobile communication devices (e.g., 150a, 150b, 150c, collectively 150) that are within the simulator's wireless communication range 135a. For example, the activated cell site simulator 130 may broadcast RF signals that cause the mobile communication devices 150 to communicate with the activated cell simulator 130a as part of a cell reselection routine.

Figure 1C:
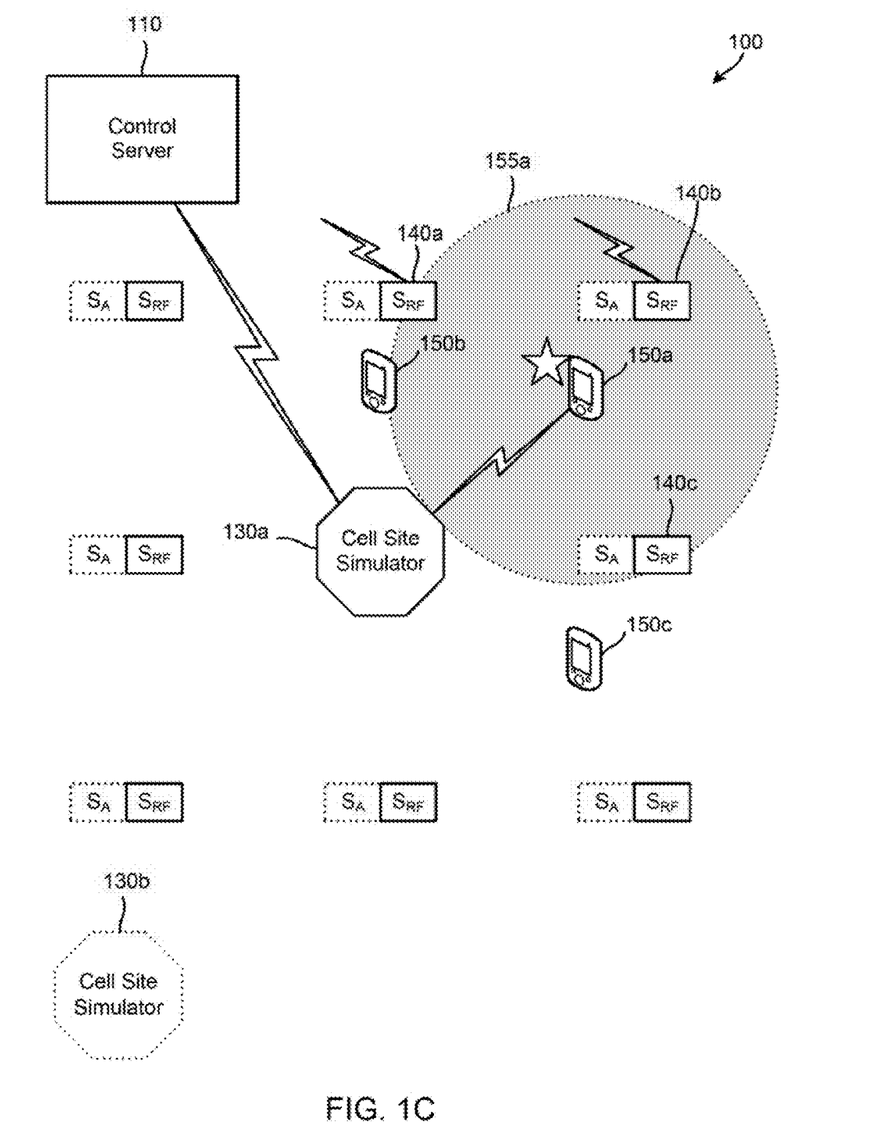

Referring to FIG. 1C, the mobile communication devices 150 may respond to the broadcast signals from the activated cell simulator 130a by transmitting RF signals that contain identifying information for the respective device. For example, a mobile communication device 150a may transmit RF signals that contain an International Mobile Subscriber Identity (IMSI), an International Mobile Station Equipment Identity (IMEI), Electronic Serial Number (ESN) or other identifying information that uniquely identifies a subscriber of the device, the device itself, or any combination thereof. The activated cell site simulator 130a may automatically, or upon request, transmit the identifying information obtained from the mobile communication devices 150 to the control server 110 over a wired or wireless network.

To determine the location of the identified mobile communication devices 150, the control server 110 may use information from a set of the RF sensors $S_{RF}$ (e.g., 140a and 140b) that intercept RF signals communicated from the mobile communication devices 150 to the activated cell site simulator 130a. In some embodiments, the control server 110 may use a geolocation technique to determine the location of a mobile communication device based on differences in arrival time, phase, or amplitude of an RF signal that is communicated to the activated cell site simulator and intercepted by the RF sensors $S_{RF}$ 140. The RF sensors $S_{RF}$ may be computing devices that are distributed over the target geographical area. In some embodiments, the RF sensors $S_{RF}$ may be distributed at fixed locations that are the same as or different from the acoustic sensors $S_{RF}$. In some embodiments, the number of RF sensors $S_{RF}$ may be the same, less than or greater than the number of the acoustic sensors $S_{RF}$ distributed within the target geographical area.

Figure 1D:
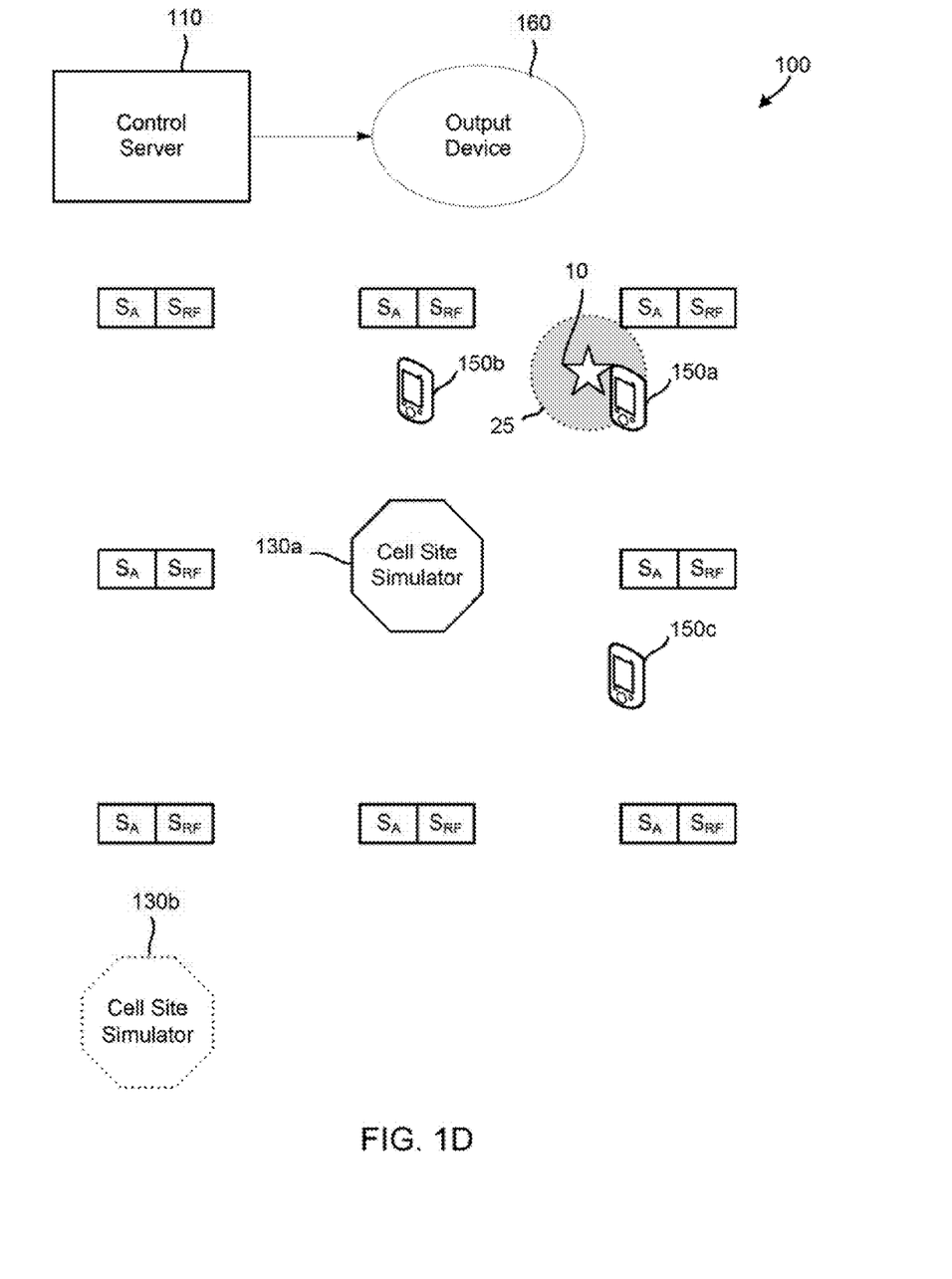

Referring to FIG. 1D, in response to determining the locations of the respective mobile communication devices 150, the control server 110 may be configured to determine which of the identified mobile communication devices (e.g., 150a) are within a defined geographic region 25 of the determined gunshot location 10. For example, the control server 110 may provide the identifying information of the mobile communication devices (e.g., 150a) to an output device (e.g., 160) for authorized access by a third party, such as a law enforcement, intelligence, or military agency.

Figure 2:
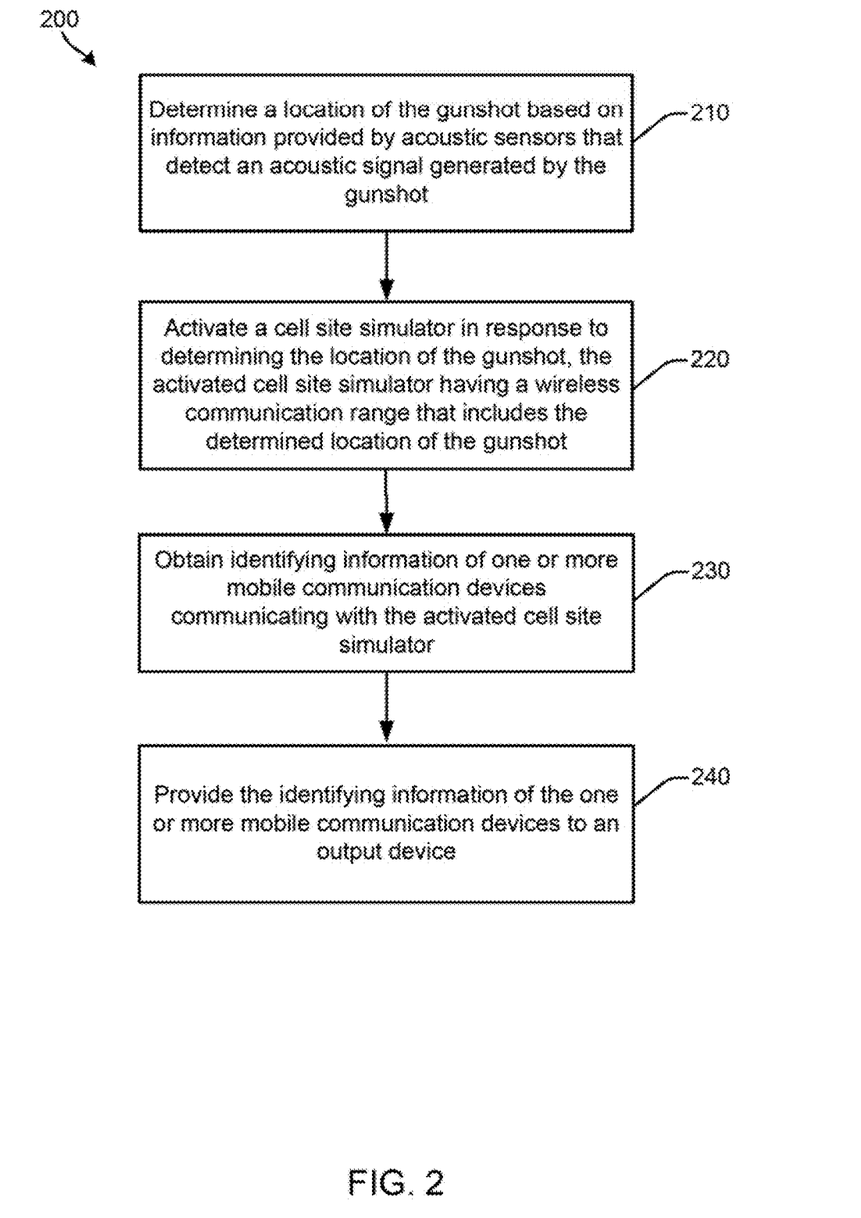
FIG. 2 is a process flow diagram illustrating a method of automatically identifying mobile communication devices within a vicinity of a gunshot according to some embodiments.

FIG. 2 is a process flow diagram illustrating a method 200 of automatically identifying mobile communication devices located within a vicinity of a gunshot according to some embodiments. With reference to FIGS. 1A-2, the method 200 may be performed by a processor of a control server (e.g., 110).

In block 210, a processor of the control server (e.g., 110) may determine the location of the gunshot (e.g., 10) based on information provided by multiple acoustic sensors (e.g., 120) that detect an acoustic signal generated by a gunshot (e.g., 20). The determined location of the gunshot may be a single point or an area location. The determined location may be identified in two-dimensions (e.g., latitude and longitude) using information provided by three acoustic sensors or in three-dimensions (e.g., latitude, longitude, and altitude) using information provided by four or more acoustic sensors. The determined location may be defined using any two-dimensional (2D) or three-dimensional (3D) coordinate system.

The processor of the control server (e.g., 110) may determine the location of the gunshot (e.g., 10) based on differences in arrival time, phase, or amplitude of the gunshot-generated acoustic signal (e.g., 20) detected at the acoustic sensors (e.g., 120), or any combination thereof. The processor of the control server (e.g., 110) may obtain the respective arrival times, phases, or amplitudes of the acoustic signal 20 directly from the acoustic sensors (e.g., 120) or may derive the respective arrival times, phases or amplitudes from digital representations of the acoustic signal (e.g., 20) provided by the acoustic sensors (e.g., 120). In some embodiments, the processor may determine the location of a gunshot by employing a geolocation technique in which the location may be determined based on the intersection of hyperbolas having geometries defined by differences in the arrival times of the gunshot-generated acoustic signal (e.g., 20) between three or more acoustic sensors (e.g., 120a, 120b, and 120c).

In block 220, the processor of the control server (e.g., 110) may activate a cell site simulator (e.g., 130a) in response to determining the location of the gunshot (e.g., 10). The processor may select the cell site simulator (e.g., 130a) having a wireless communication range (e.g., 135a) that includes the determined location of the gunshot (e.g., 10). In some embodiments, the processor of the control server (e.g., 110) may select the cell site simulator to activate (e.g., 130a) from amongst multiple cell site simulators that are available for selection (e.g., 130a, 130b). In some embodiments, more than one cell site simulator may be activated by the processor of the control server (e.g., 110).

In some embodiments, the processor of the control server (e.g., 110) may select the cell site simulators to activate (e.g., 130a) based on the distance between the cell site simulator and the determined gunshot location (e.g., 10). For example, the cell site simulator (e.g., 130a) that is closest to the determined location of the gunshot (e.g., 10) may be selected for activation. In some embodiments, other criteria may be used to determine which cell site simulator to select for activation. For example, a cell site simulator may be selected if the simulator is determined to have a line of sight to the gunshot location. In some embodiments, a cell site simulator may be determined to have a line of sight to the gunshot location using a map which identifies no or a limited number of obstructions (e.g., buildings, etc.) between the gunshot location and the cell site simulator.

In some embodiments, the processor of the control server (e.g., 110) may transmit a command message or an interrupt signal over a wired or wireless network to activate the cell site simulator (e.g., 130a). In response to the activation command or signaling, the activated cell site simulator (e.g., 130) may broadcast RF signals that mimic or spoof the behavior of a base transceiver station (BTS), Node B, Evolved Node B (eNodeB) or other existing wireless transceiver device. In some embodiments, the activated cell site simulator 130 may broadcast RF signals that cause the mobile communication devices 150 to communicate with the activated cell simulator 130a as part of a cell reselection routine.

For example, mobile communication devices may require contact with a cell site in order to receive phone calls or data transmissions. Mobile communication devices may be configured to determine which cell site to select based on signal quality. The signal quality of a cell site may be qualitatively scored based on a so called "C1" value, which corresponds to a signal strength of the cell site. In order to prevent constant hunting between cell sites of similar signal strength, mobile communication devices may be configured to perform cell reselection when the C1 value of a neighboring cell site exceeds the value of the current cell site by an offset called the Cell Reselected Hysteresis (CRH). Thus, to increase the probability that the mobile communication devices (e.g., 150) reselect the activated cell site simulator (e.g., 130a), the activated cell site simulator may broadcast a Cell Reselection Offset (CRO) value that artificially inflates its C1 value. In some embodiments, the activated cell site simulator (e.g., 130a) may continuously broadcast its CRO value for a sufficient period or window of time to trigger cell reselection in the mobile communication devices (e.g., 150), particularly those that may be camped on high power, umbrella cells and require more time to perform cell reselection.

In block 230, the processor of the control server (e.g., 110) may obtain identifying information of one or more mobile communication devices (e.g., 150) communicating with the activated cell site simulator (e.g., 130a). For example, the mobile communication devices (e.g., 150) may respond to the RF signals broadcast from the activated cell site simulator (e.g., 130a) by transmitting RF signals that contain identifying information of the respective device. The identifying information may include, but is not limited to, an International Mobile Subscriber Identity (IMSI), an International Mobile Station Equipment Identity (IMEI), Electronic Serial Number (ESN) or other identifying information that uniquely identifies a subscriber of the device, the device itself, or any combination thereof. The activated cell site simulator (e.g., 130a) may automatically, or upon request, transmit the identifying information to the control server 110 over a wired or wireless network.

In block 240, the processor of the control server (e.g., 110) may provide the identifying information of the one or more mobile communication devices (e.g., 150) to an output device (e.g., 160). For example, in some embodiments, the output device (e.g., 160) may be a database server or other storage device that is capable of storing the identifying information and providing authorized user access to the identifying information via a web browser or other user interface. In some embodiments, the output device 160 may facilitate communications (e.g., email, text, phone, fax, etc) through an emergency alert system or other automated notification system to alert designated personnel or agencies (e.g., law enforcement, intelligence or military).

Figure 3:
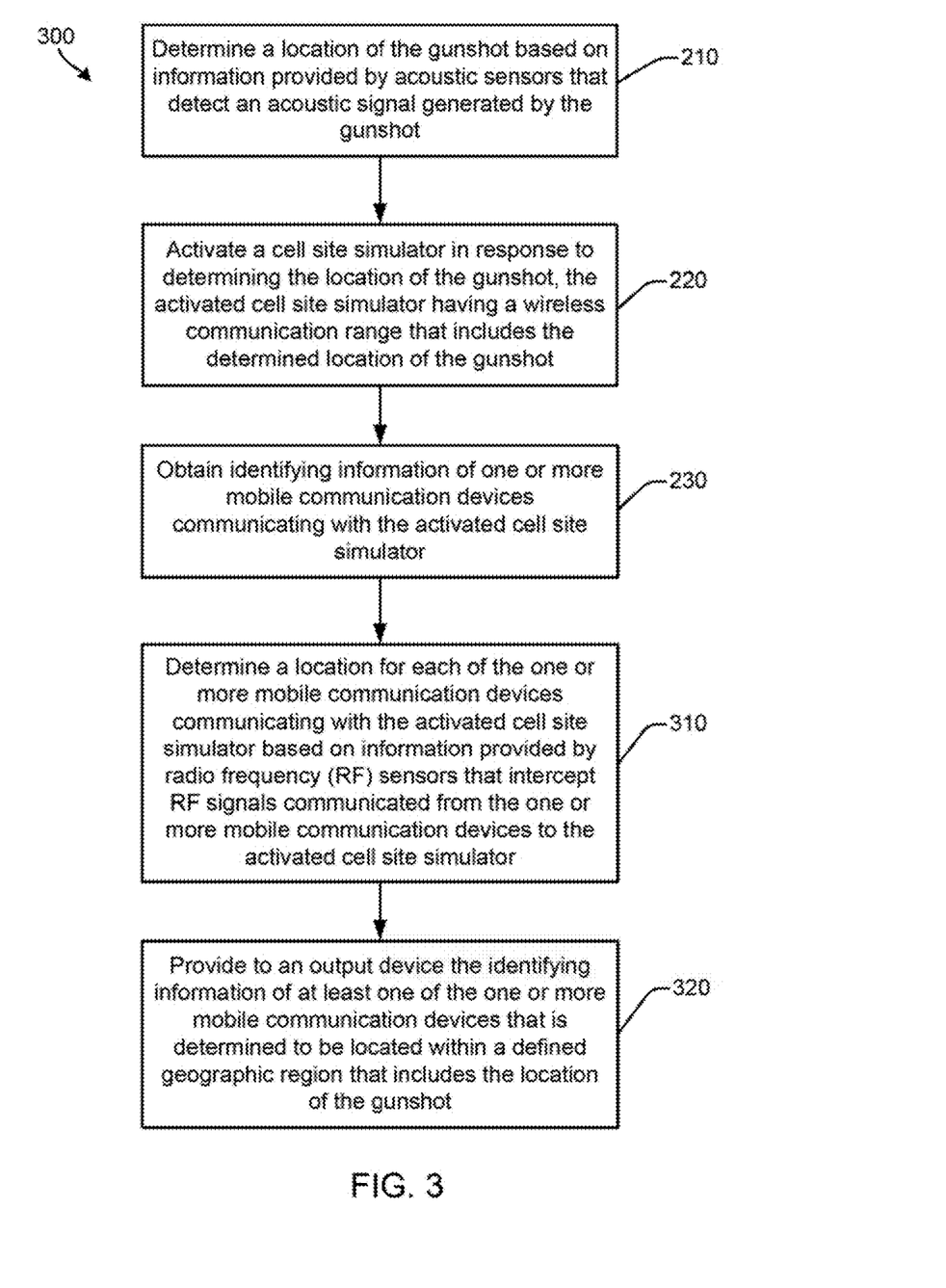
FIG. 3 is a process flow diagram illustrating another method of automatically identifying mobile communication devices within a vicinity of a gunshot according to some embodiments.

FIG. 3 is a process flow diagram illustrating another method 300 of automatically identifying mobile communication devices within a vicinity of a gunshot according to some embodiments. The method 300 may provide further precision in locating the one or more mobile communication devices (e.g., 150) in communication with the activated cell site simulator (e.g., 130a) and provide the identifying information of those devices (e.g., 150a) that are within a defined geographical region of the gunshot location. The method 300 may be performed by a processor of server computing device (e.g., control server 110 of FIGS. 1A-1D). With reference to FIGS. 1A-3, the method 300 includes operations in blocks 210, 220, and 230 described for like numbered blocks with reference to FIG. 2.

In block 310, the processor of the control server (e.g., 110) may determine a location for each of the one or more mobile communication devices communicating with the activated cell site simulator (e.g., 130a). The determined locations may be based on information provided by radio frequency (RF) sensors (e.g., 140a, 140b, 140c, collectively 140) that intercept the RF signals communicated from the one or more mobile communication devices (e.g., 150) to the activated cell site simulator (e.g., 130a).

The location determined for each of the mobile communication devices may be a single point or an area location. The determined location may be identified in two-dimensions (e.g., latitude and longitude) using information provided by the activated cell site simulator (e.g., 130a) and two or more RF sensors 140. The determined location may be identified in three-dimensions (e.g., latitude, longitude, and altitude) using information provided by the activated cell site simulator (e.g., 130a) and three or more RF sensors 140. The determined locations may be defined using any two-dimensional (2D) or three-dimensional (3D) coordinate system.

In some embodiments, the processor of the control server (e.g., 110) may determine the location of a mobile communication device (e.g., 150a) based on differences in arrival time, phase, or amplitude of an RF signal (e.g., 155a), or any combination thereof, that is communicated to the activated cell site simulator (e.g., 130a) and intercepted by a set of the RF sensors $S_{RF}$ (e.g., 140). For example, the processor may determine the location of a mobile communication device (e.g., 150a) by employing a geolocation technique in which the location may be determined based on the intersection of hyperbolas having geometries defined by differences in the arrival times of the gunshot-generated acoustic signal (e.g., 20) between the activated cell site simulator (e.g., 130a) and two or more RF sensors (e.g., 140).

In order to determine which of the RF signals intercepted by the RF sensors 140 correspond to the RF signal (e.g., 155a) that is communicated by a respective mobile communication device, the processor of the control server (e.g., 110) may compare digital representations of the RF signals intercepted by the RF sensors 140 against a digital representation of the RF signal (e.g., 155a) received by the activated cell site simulator (e.g., 130a). In some embodiments, the processor may perform a correlation operation (e.g., dot product) to compare and match the intercepted RF signals to the RF signal (e.g., 155a) received at the activated cell site simulator (e.g., 130a). In response to determining which of the intercepted RF signals match the RF signal (e.g., 155a) received by the activated cell site simulator (e.g., 130a), the processor may determine differences in arrival time, phase, amplitude, or any combination thereof, between the matching RF signals and the RF signal received at the activated cell site simulator.

In block 320, the processor of the control server (e.g., 110) may provide to an output device (e.g., 160) the identifying information of at least one of the one or more mobile communication devices (e.g., 150a) that is determined to be located within a defined geographic region (e.g., 25) of the determined gunshot location (e.g., 10). In some embodiments, the defined geographic region may be collocated with the determined gunshot location (e.g., 10). In some embodiments, the defined geographic region (e.g., 25) may have dimensions that are greater than the determined gunshot location but less than the wireless communication range (e.g., 135a) of the activated cell site simulator (e.g., 130a).

In some embodiments, the output device (e.g., 160) may be a database server or other storage device that is capable of storing the identifying information and providing authorized user access to the identifying information via a web browser or other user interface. In some embodiments, the output device 160 may facilitate communications (e.g., email, text, phone, fax, etc) through an emergency alert system or other automated notification system for alerting designated personnel or agencies (e.g., law enforcement, intelligence or military).

Figure 4:
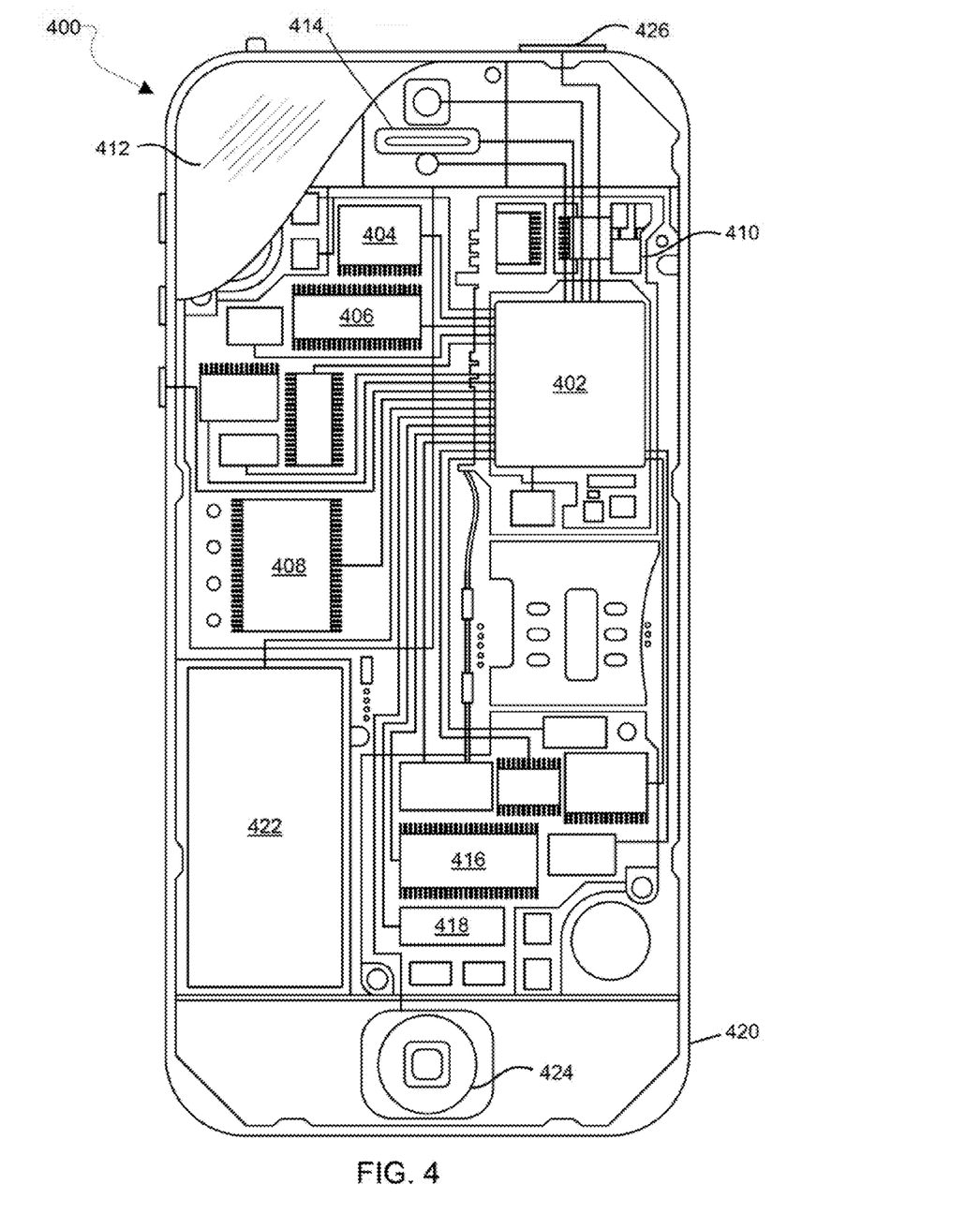
FIG. 4 is a schematic diagram illustrating components of a smartphone type mobile communication device suitable for use with various embodiments.

The various embodiments may be implemented on any of a variety of commercially available computing devices. For example, FIG. 4 is a schematic diagram illustrating components of a smartphone type mobile communication device 400, such as the mobile communication devices 150 as described with reference to FIGS. 1A-1D. In some embodiments, a mobile communication device 400 may be configured to implement the methods 200 and 300 of the control server 110 as described with reference to FIGS. 2 and 3. A mobile communication device 400 may include a processor 402 coupled to a touchscreen controller 404 and an internal memory 406. The processor 402 may be one or more multi-core integrated circuits designated for general or specific processing tasks. The internal memory 406 may be volatile or non-volatile memory. The touchscreen controller 404 and the processor 402 may also be coupled to a touchscreen panel 412, such as a resistive-sensing touchscreen, capacitive-sensing touchscreen, infrared sensing touchscreen, etc. Additionally, the display of the communication device 400 need not have touch screen capability. Additionally, the mobile communication device 400 may include a cellular network transceiver 408 coupled to the processor 402 and to an antenna 404 for sending and receiving electromagnetic radiation that may be connected to a wireless data link. The transceiver 408 and the antenna 410 may be used with the above-mentioned circuitry to implement various embodiment methods.

The mobile communication device 400 may have a cellular network transceiver 408 coupled to the processor 402 and to an antenna 410 and configured for sending and receiving cellular communications. The mobile communication device 400 may include one or more SIM cards 416, 418 coupled to the transceiver 408 and/or the processor 402 and may be configured as described above.

The mobile communication device 400 may also include speakers 414 for providing audio outputs. The mobile communication device 400 may also include a housing 420, constructed of a plastic, metal, or a combination of materials, for containing all or some of the components discussed herein. The mobile communication device 400 may include a power source 422 coupled to the processor 402, such as a disposable or rechargeable battery. The rechargeable battery may also be coupled to the peripheral device connection port to receive a charging current from a source external to the communication device 400. The communication device 400 may also include a physical button 424 for receiving user inputs. The mobile communication device 400 may also include a power button 426 for turning the mobile communication device 400 on and off.

Figure 5:
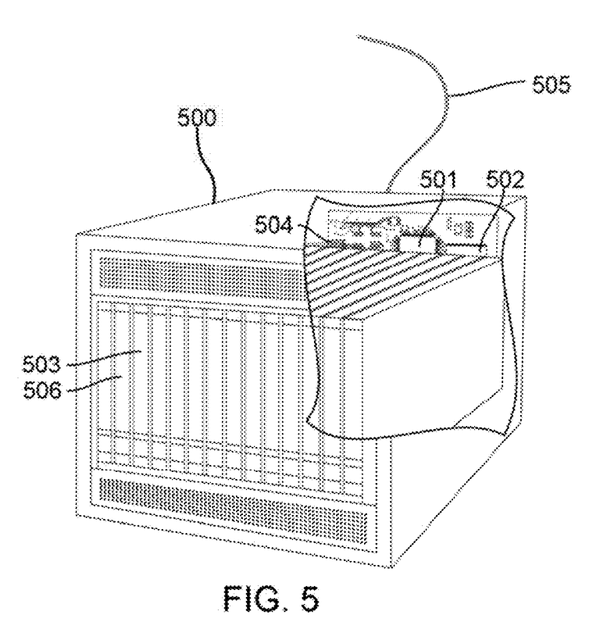
FIG. 5 is a schematic diagram illustrating components of a server suitable for use with various embodiments.

FIG. 5 is a schematic diagram illustrating components of a server 500 that may be configured to implement methods according to some embodiments, including the embodiments of the methods 200 and 300 described with reference to FIGS. 2 and 3. Such a server 500 typically includes a processor 501 coupled to volatile memory 502 and a large capacity nonvolatile memory, such as a disk drive 503. The server 500 may also include a floppy disc drive, compact disc (CD) or DVD disc drive 506 coupled to the processor 501. The server 500 may also include network access ports 504 coupled to the processor 501 for establishing data connections with a network 505, such as a local area network coupled to other broadcast system computers and servers.

The processor 501 may be any programmable microprocessor, microcomputer or multiple processor chip or chips that can be configured by software instructions (applications) to perform a variety of functions, including the functions of the various embodiments described above. In some embodiments, multiple processors may be provided, such as one processor dedicated to wireless communication functions and one processor dedicated to running other applications. Typically, software applications may be stored in the internal memory 502, 503 before they are accessed and loaded into the processor 501. The processor 501 may include internal memory sufficient to store the application software instructions.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a two or more microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of automatically identifying mobile communication devices located within a vicinity of a gunshot, comprising:
   determining a location of the gunshot based on information provided by a plurality of acoustic sensors that detect an acoustic signal generated by the gunshot;
   activating a cell site simulator in response to determining the location of the gunshot, the activated cell site simulator having a wireless communication range that includes the location of the gunshot;
   obtaining identifying information of one or more mobile communication devices communicating with the activated cell site simulator; and
   providing the identifying information of the one or more mobile communication devices to an output device.

2. The method of claim 1, wherein activating the cell site simulator having the wireless communication range that includes the location of the gunshot comprises activating one of a plurality of cell site simulators that is located closest to the determined location of the gunshot.

3. The method of claim 1, wherein activating the cell site simulator causes the cell site simulator to broadcast a radio frequency (RF) signal to trigger a response from the one or more mobile communication devices to the cell site simulator that contains the identifying information of the respective mobile communication devices.

4. The method of claim 3, wherein the RF signal that is broadcast by the activated cell site simulator comprises a cell reselection offset that causes the one or more mobile communication devices to perform cell reselection with the activated cell site simulator.

5. The method of claim 1, further comprising:
   determining a location for each of the one or more mobile communication devices communicating with the activated cell site simulator based on information provided by a plurality of radio frequency (RF) sensors that intercept RF signals communicated from the plurality of mobile communication devices to the activated cell site simulator; and
   providing to the output device the identifying information of at least one of the one or more mobile communication devices that is determined to be located within a defined geographic region that includes the location of the gunshot.

6. The method of claim 5, wherein determining the location for each of the one or more mobile communication devices communicating with the activated cell site simulator based on the information provided by the plurality of RF sensors comprises determining the location of each mobile communication device based on differences in arrival time, phase, or amplitude of an RF signal received at the activated cell site simulator and intercepted by the plurality of RF sensors.

7. The method of claim 1, wherein determining the location of the gunshot based on the information provided by the plurality of acoustic sensors comprises determining the location of the gunshot based on differences in arrival time, phase, or amplitude of the acoustic signal detected at the plurality of acoustic sensors.

8. The method of claim 7, further comprising determining the differences in arrival time, phase, or amplitude of the acoustic signal detected at the plurality of acoustic sensors based on respective digital representations of the acoustic signal provided by the plurality of acoustic sensors.

9. The method of claim 1, wherein the identifying information comprises an identifier that uniquely identifies a subscriber of a respective mobile communication device, the device itself, or any combination thereof.

10. A computing device for automatically identifying mobile communication devices located within a vicinity of a gunshot, comprising:
a processor configured with processor-executable instructions to:
determine a location of the gunshot based on information provided by a plurality of acoustic sensors that detect an acoustic signal generated by the gunshot;
activate a cell site simulator in response to determining the location of the gunshot, the activated cell site simulator having a wireless communication range that includes the location of the gunshot;
obtain identifying information of one or more mobile communication devices communicating with the activated cell site simulator; and
provide the identifying information of the one or more mobile communication devices to an output device.

11. The computing device of claim 10, wherein to activate the cell site simulator having the wireless communication range that includes the location of the gun shot, the processor is further configured with the processor-executable instructions to activate one of a plurality of cell site simulators that is located closest to the determined location of the gunshot.

12. The computing device of claim 10, wherein activating the cell site simulator causes the cell site simulator to broadcast a radio frequency (RF) signal to trigger a response from the one or more mobile communication devices to the cell site simulator that contains the identifying information of the respective mobile communication devices.

13. The computing device of claim 12, wherein the RF signal that is broadcast by the activated cell site simulator comprises a cell reselection offset that causes the one or more mobile communication devices to perform cell reselection with the activated cell site simulator.

14. The computing device of claim 10, wherein the processor is further configured with the processor-executable instructions to:
determine a location for each of the one or more mobile communication devices communicating with the activated cell site simulator based on information provided by a plurality of radio frequency (RF) sensors that intercept RF signals communicated from the plurality of mobile communication devices to the activated cell site simulator; and
provide to the output device the identifying information of at least one of the one or more mobile communication devices that is determined to be located within a defined geographic region that includes the location of the gunshot.

15. The computing device of claim 14, wherein to determine the location for each of the one or more mobile communication devices communicating with the activated cell site simulator based on the information provided by the plurality of RF sensors, the processor is further configured with the processor-executable instructions to determine the location of each mobile communication device based on differences in arrival time, phase, or amplitude of an RF signal received at the activated cell site simulator and intercepted by the plurality of RF sensors.

16. The computing device of claim 10, wherein the identifying information comprises an identifier that uniquely identifies a subscriber of a respective mobile communication device, the device itself, or any combination thereof.

17. A non-transitory processor-readable storage medium having stored thereon processor-executable instructions configured to cause a processor of a computing device to perform operations comprising:
determining a location of a gunshot based on information provided by a plurality of acoustic sensors that detect an acoustic signal generated by the gunshot;
activating a cell site simulator in response to determining the location of the gunshot, the activated cell site simulator having a wireless communication range that includes the location of the gunshot;
obtaining identifying information of one or more mobile communication devices communicating with the activated cell site simulator; and
providing the identifying information of the one or more mobile communication devices to an output device.

18. The non-transitory processor-readable storage medium of claim 17, wherein the stored processor-executable instructions are configured to cause a processor of a computing device to perform operations further comprising:
determining a location for each of the one or more mobile communication devices communicating with the activated cell site simulator based on information provided by a plurality of radio frequency (RF) sensors that intercept RF signals communicated from the plurality of mobile communication devices to the activated cell site simulator; and
providing to the output device the identifying information of at least one of the one or more mobile communication devices that is determined to be located within a defined geographic region that includes the location of the gunshot.

19. A computing device for automatically identifying mobile communication devices located within a vicinity of a gunshot, comprising:
means for determining a location of the gunshot based on information provided by a plurality of acoustic sensors that detect an acoustic signal generated by the gunshot;
means for activating a cell site simulator in response to determining the location of the gunshot, the activated cell site simulator having a wireless communication range that includes the location of the gunshot;
means for obtaining identifying information of one or more mobile communication devices communicating with the activated cell site simulator; and
means for providing the identifying information of the one or more mobile communication devices to an output device.

20. The computing device of claim 19, further comprising:
means for determining a location for each of the one or more mobile communication devices communicating with the activated cell site simulator based on information provided by a plurality of radio frequency (RF) sensors that intercept RF signals communicated from the plurality of mobile communication devices to the activated cell site simulator; and
means for providing to the output device the identifying information of at least one of the one or more mobile communication devices that is determined to be located within a defined geographic region that includes the location of the gunshot.

* * * * *